US011490490B2

(12) United States Patent
Kowalenko et al.

(10) Patent No.: US 11,490,490 B2
(45) Date of Patent: Nov. 1, 2022

(54) HYPERBRIGHT MOTION FLOOD LIGHT

(71) Applicant: Good Earth Lighting, Inc., Mount Prospect, IL (US)

(72) Inventors: Alexander Kowalenko, Inverness, IL (US); Brian Coleman, Hawthorn Woods, IL (US); Brian Calderon, Skokie, IL (US)

(73) Assignee: Good Earth Lighting, Inc., Mount Prospect, IL (US)

( * ) Notice: Subject to any disclaimer, the term of this patent is extended or adjusted under 35 U.S.C. 154(b) by 0 days.

(21) Appl. No.: 17/131,395

(22) Filed: Dec. 22, 2020

(65) Prior Publication Data

US 2021/0195715 A1 Jun. 24, 2021

Related U.S. Application Data

(60) Provisional application No. 62/952,617, filed on Dec. 23, 2019.

(51) Int. Cl.
| | |
|---|---|
| H05B 45/10 | (2020.01) |
| H05B 47/115 | (2020.01) |
| H05B 47/17 | (2020.01) |
| H05B 45/20 | (2020.01) |
| F21V 21/26 | (2006.01) |
| F21S 8/00 | (2006.01) |
| F21Y 115/10 | (2016.01) |

(52) U.S. Cl.
CPC ............ *H05B 47/115* (2020.01); *F21S 8/003* (2013.01); *F21V 21/26* (2013.01); *H05B 45/10* (2020.01); *H05B 45/20* (2020.01); *H05B 47/17* (2020.01); *F21Y 2115/10* (2016.08)

(58) Field of Classification Search
CPC ........ H05B 45/10; H05B 45/20; H05B 47/17; H05B 47/105; H05B 47/115; Y02B 20/40; F21V 21/30; F21V 21/26; F21V 23/0471; F21S 8/003; F21S 8/033; F21Y 2115/10
See application file for complete search history.

(56) References Cited

U.S. PATENT DOCUMENTS

| | | | | |
|---|---|---|---|---|
| 5,442,177 | A * | 8/1995 | Boulos | H05B 47/115 250/342 |
| 9,622,325 | B2 * | 4/2017 | Chen | H05B 47/115 |
| 10,887,958 | B1 * | 1/2021 | Fu | F21S 8/033 |
| 10,966,306 | B1 * | 3/2021 | Recker | H02J 13/00006 |
| 11,200,858 | B1 * | 12/2021 | Liou | G09G 3/006 |
| 2007/0132997 | A1 * | 6/2007 | Chuang | G01J 5/60 356/402 |

(Continued)

*Primary Examiner* — Haissa Philogene
(74) *Attorney, Agent, or Firm* — McDermott Will and Emery LLP

(57) ABSTRACT

A lighting appliance includes a housing, a lighting element disposed in the housing is capable of displaying multiple color temperatures, a control unit disposed in the housing, an electrical communication system in communication with the lighting element and the control unit, and a sensor disposed on a portion of the housing, where the sensor is in communication with the lighting element and the control unit via the electrical communication system, and when a motion signal is detected by the sensor, the control unit is configured to instruct the lighting element to illuminate in a predetermined light mode for a predetermined time.

19 Claims, 10 Drawing Sheets

(56) References Cited

U.S. PATENT DOCUMENTS

2013/0193857 A1\* 8/2013 Tlachac .................. H05B 47/11
  315/153
2017/0231053 A1\* 8/2017 Underwood ............ H04L 67/12
2019/0350066 A1\* 11/2019 Herf ....................... H05B 47/11

\* cited by examiner

PIR Mapping Data

| Conditions | Sensitivity at max, Ambient temperature at 22°C | | | | | |
|---|---|---|---|---|---|---|
| PIR Sensing region | Left | | Middle | Right | | |
| Angle | 90° | 60° | 30° | 0° | 30° | 60° | 90° |
| Distance | 17m | 26m | 29m | 31m (101ft) | 28m | 27m | 13.5m |

FIG. 9

Power Data

| Input power | CCT at 3000k | | CCT at 4000k | | CCT at 5000k | | Standby power |
|---|---|---|---|---|---|---|---|
| | High beam | Low beam | High beam | Low beam | High beam | Low beam | |
| AC120V | 81.5W | 43.5W | 82.4W | 43.3W | 81.0W | 43.4W | 0.35W |

FIG. 10

Lighting Parameters

| Mode | CCT (K) | Lumen (lm) | CRI | Eff. (Lm/w) | Power (W) |
|---|---|---|---|---|---|
| At High beam + 5000K | 5120 | 6948 | 86.4 | 85.9 | 80.9 |
| At Low beam + 5000K | 5148 | 3991 | 87.3 | 89.7 | 44.5 |
| At High beam + 4000K | 4341 | 7371 | 86.6 | 89.3 | 82.5 |
| At Low beam + 4000K | 4306 | 3960 | 87.1 | 89.8 | 44.1 |
| At High beam + 3000K | 3053 | 6834 | 83.7 | 81.4 | 81.5 |
| At Low beam + 3000K | 3045 | 3875 | 84 | 83.9 | 43.8 |

FIG. 11

HYPERBRIGHT MOTION FLOOD LIGHT

CROSS REFERENCE TO RELATED APPLICATIONS

This application claims priority to U.S. Provisional Application No. 62/952,617 filed Dec. 23, 2019, the entire contents of which are incorporated herein for reference.

TECHNICAL FIELD

The present disclosure generally relates to security lighting, and more specifically to outdoor security lighting capable of displaying multiple color temperatures and with a passive infrared sensor.

SUMMARY

A lighting appliance includes a housing, a lighting element disposed in the housing is capable of displaying multiple color temperatures, a control unit disposed in the housing, an electrical communication system in communication with the lighting element and the control unit, and a sensor disposed on a portion of the housing, where the sensor is in communication with the lighting element and the control unit via the electrical communication system, and when a motion signal is detected by the sensor, the control unit is configured to instruct the lighting element to illuminate in a predetermined light mode for a predetermined time.

BRIEF DESCRIPTION OF THE DRAWINGS

The drawing figures depict one or more implementations in accord with the present teachings, by way of example only, not by way of limitation.

FIG. 5 is a side view of an arm of an embodiment of a lighting appliance according to exemplary implementations of the present disclosure.

FIG. 9 is a table of passive infrared sensor mapping data for a lighting appliance according to exemplary implementations of the present disclosure.

FIG. 10 is a table of power data for a lighting appliance according to exemplary implementations of the present disclosure.

FIG. 11 is a table of lighting parameters for a lighting appliance according to exemplary implementations of the present disclosure.

DETAILED DESCRIPTION

Figure 1:
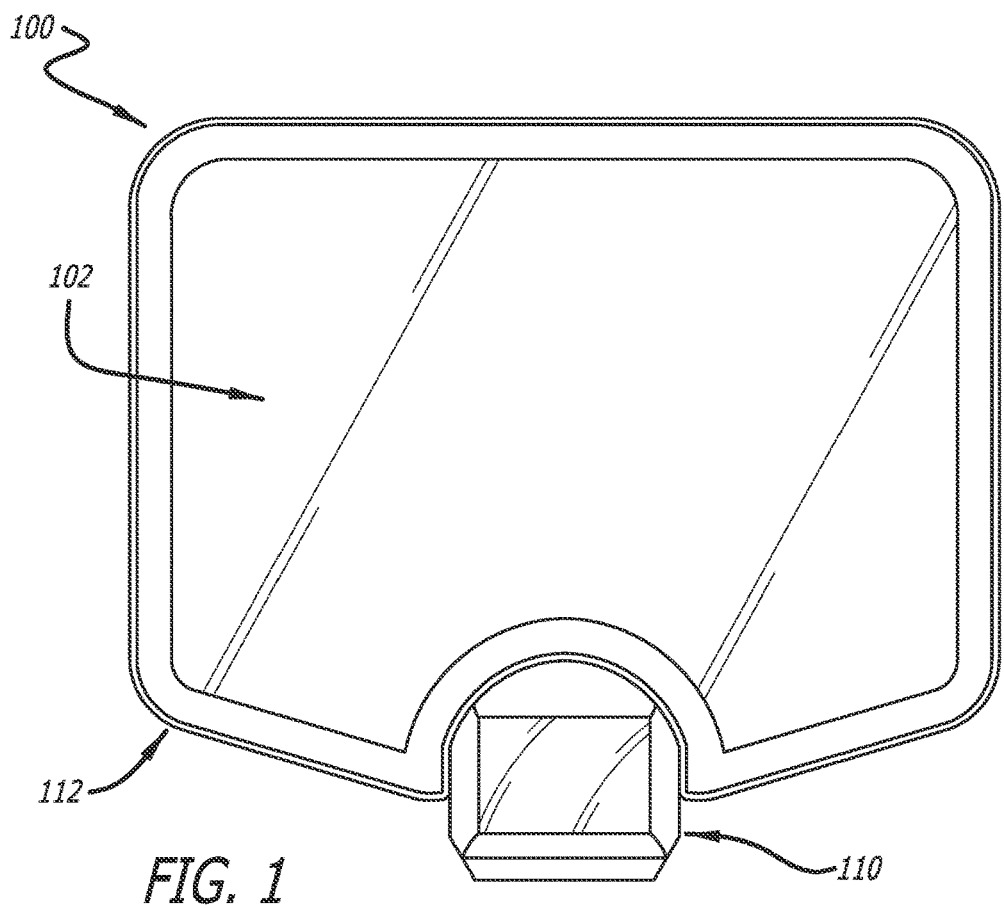
FIG. 1 is a front view of an embodiment a lighting appliance according to exemplary implementations of the present disclosure.

While this disclosure includes a number of details and implementations in many different forms, there is shown in the drawings and will herein be described in detail particular implementations with the understanding that the present disclosure is to be considered as an exemplification of the principles of the disclosed methods and systems, and is not intended to limit the broad aspects of the disclosed concepts to the implementations illustrated.

FIG. 1 shows a lighting appliance 100 that can be used for a variety of applications, such as outdoor security lighting. The lighting appliance 100 is capable of displaying multiple color temperatures, such as 3000K, 4000K, and 5000K.

The color temperature or color of light emitted by the lighting appliance 100 may be controlled by selectively activating the lighting elements 102 in sections of the lighting appliance 100. The lighting elements 102 may be LEDs or any other type of component that emits light. The lighting elements 102 as LEDs may be better shown in FIG. 12. The lighting appliance 100 also may include control circuitry programmed to generate commands to control drive currents delivered to multiple groups of LEDs 102 in the lighting appliance 100 so that the lighting appliance 100 emits light of a specified color temperature. For example, lighting appliance 100 may include a first group of LEDs 104 and a second group of LEDs 106 in each lighting appliance 100, where each group of LEDs 102 emit a different color temperature of light. Lighting appliance 100 may include any number of LED 102 groups that emit different color temperatures of light. By way of example, the color temperatures may be in a range of 3000K, 4000K, or 5000K. The intensity of the light emitted by the lighting appliance 100 may also be adjusted, such as to be a low beam of light or a high beam of light.

Figure 4:
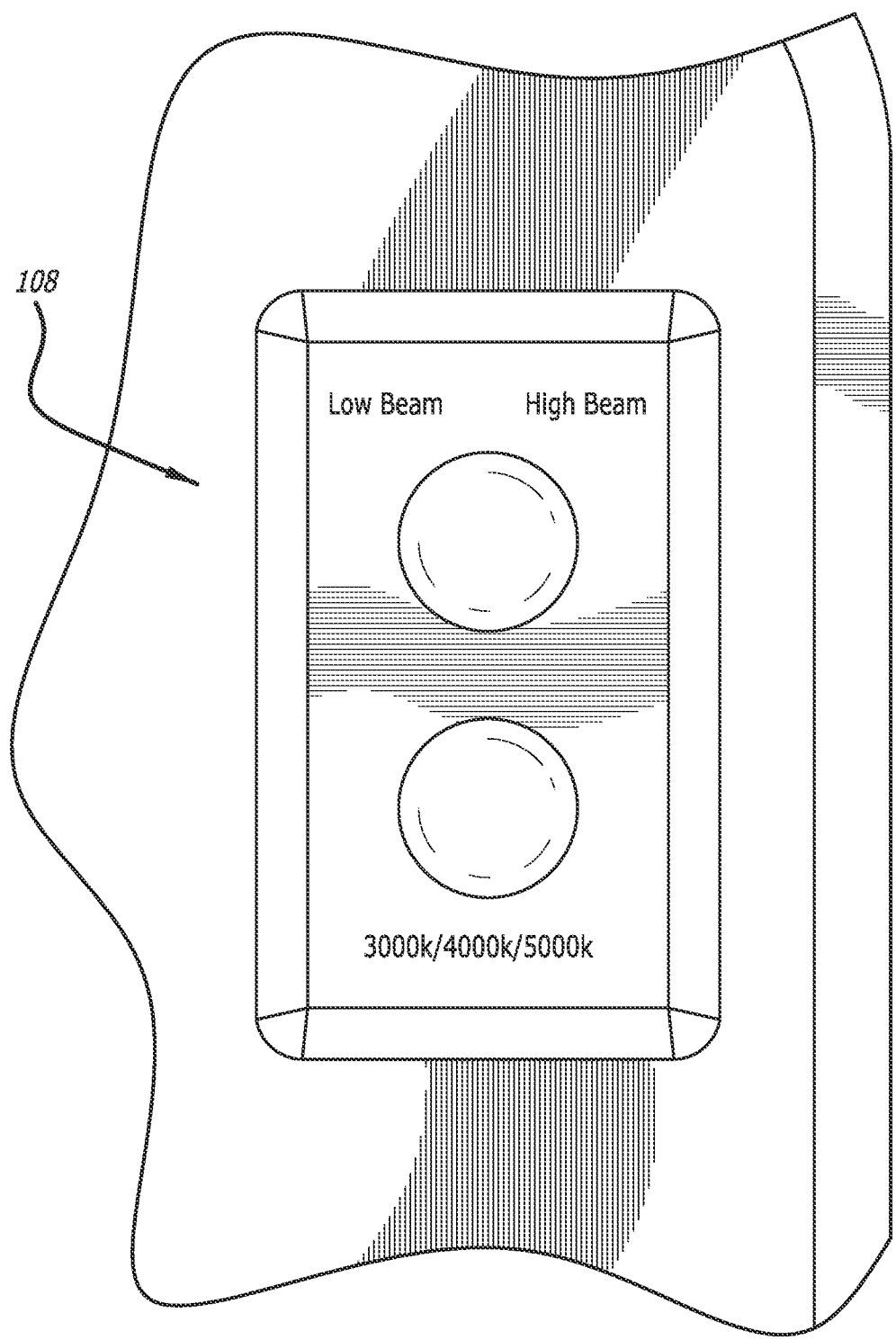
FIG. 4 is a view of a feature of an embodiment of a lighting appliance according to exemplary implementations of the present disclosure.

Lighting appliance 100 may include user selectable controls 108 to adjust the type of light emitted. User selectable controls 108 may be shown in FIG. 4. User selectable controls 108 may allow the color temperature, such as 3000K, 4000K, or 5000K, of light to be varied manually by the user. User selectable controls 108 may also allow the intensity of the light emitted by the lighting appliance 100 to be adjusted, such as to be a low beam of light or a high beam of light. User selectable controls 108 may be a button, as shown in FIG. 4, or any other type of known selector component, such as a slide or dial.

In certain embodiments, a motion sensor 110 is disposed on the housing 112. The motion sensor 110 may be a passive infrared ("PIR") sensor or any other type of sensor that can detect movement. The PIR sensor detects body movements inside or outside buildings or properties. When the motion sensor detects movement it activates the lighting elements 102. The motion sensor 110 may be used to trigger certain features of the security lighting device 100 including energizing, de-energizing, dimming, or flashing of the lighting elements 102. The lighting elements 102 may be activated for a predetermined amount of time, such as, for example, one minutes, five minutes, ten minutes, or any other amount of time.

The motion sensor 110 is adapted to operate in a plurality of detection modes, including a "surface detection" mode and a "walk-by detection" mode. In the "surface detection" mode, the motion sensor detects movement below the lighting appliance 100. When the motion sensor 110 detects movement below the lighting appliance 100 in the "surface detection" mode, the lighting elements 102 are activated. In the "walk-by detection" mode, the motion sensor 110 detects movement forwardly of the lighting appliance 100. When the motion sensor 110 detects such movement forwardly of the lighting appliance 100, the lighting elements 102 are activated. For example, when the lighting appliance 100 is mounted on the side of a building or house, the motion detector 102 triggers a circuit that activates the lighting elements 102 when a user walks by or moves in front of the area forward of the lighting appliance 100.

The lighting appliance 100 may be operated in manual mode such that the lighting elements 102 are activated without the motion sensor 110 detecting movement. Manual mode may be initiated by a user located a distance away from lighting appliance 100, such as within a structure that lighting appliance 100 is attached to. A procedure to operate lighting appliance 100 in manual mode may include toggling an on-off switch that controls power to lighting appliance 100, such as a wall switch. An exemplary procedure may include toggling the switch off, then on, then off, then on, all within a certain span of time, such as two seconds. Other procedures may be used to initiate manual operating mode of lighting appliance 100.

Figure 2:
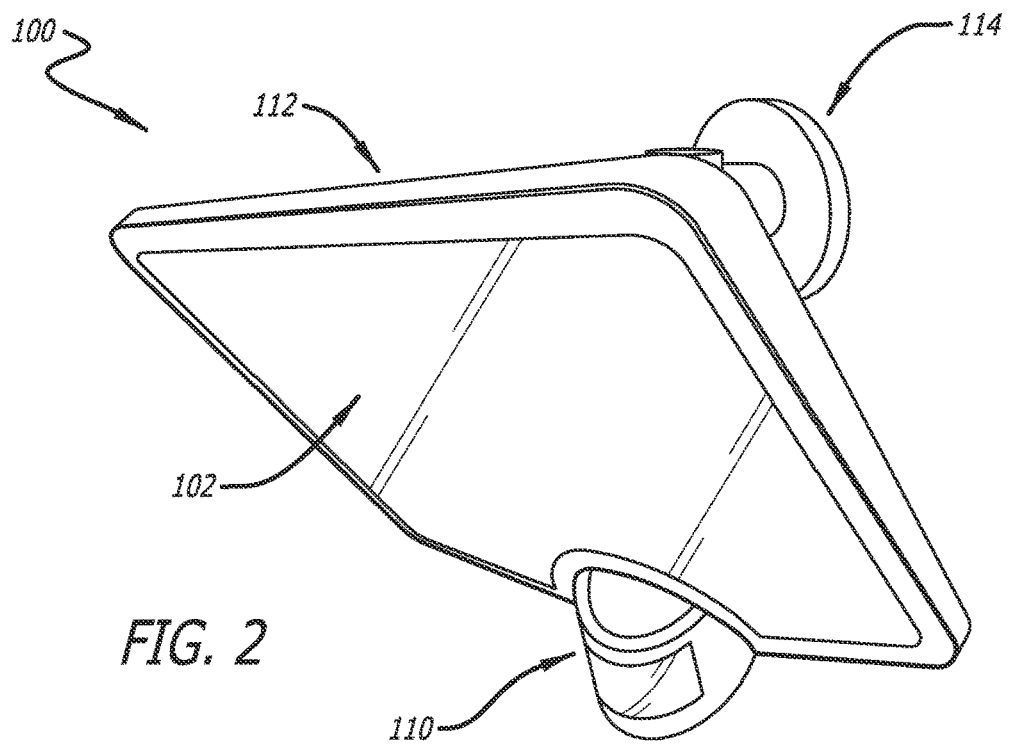
FIG. 2 is a perspective view of an embodiment of a lighting appliance according to exemplary implementations of the present disclosure.
Figure 3:
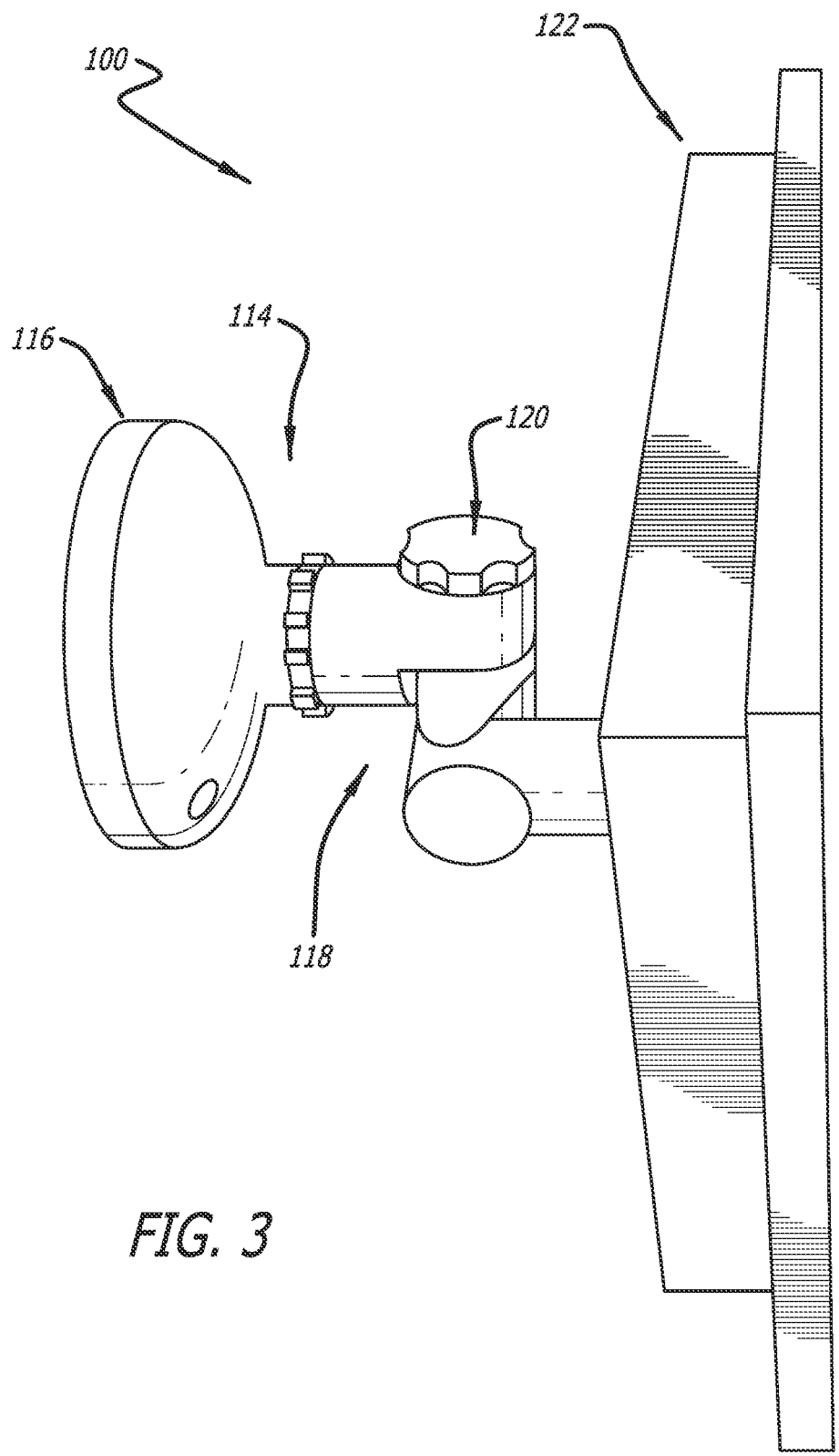
FIG. 3 is side view of an embodiment of a lighting appliance according to exemplary implementations of the present disclosure.

FIG. 2 shows a perspective view of lighting appliance 100. Lighting appliance 100 may be attached to surface, such as a wall, with bracket 114. FIG. 3 shows a side view of lighting appliance 100. Bracket 114 may include base 116 and arm 118. Arm 118 may include multiple pivot points to allow the lighting element portion 122 of lighting appliance 100 to turn and pivot as desired to point the lighting elements 102 in a desired direction. Arm 118 may include interlocking gear-like teeth (best shown in FIG. 7) within the pivot points to allow the lighting element portion 122 of lighting appliance 100 to remain in a desired orientation. Arm 118 may include a nut 120 or other component to tighten the pivot points to ensure arm 118 remains in a desired orientation.

Figure 5:
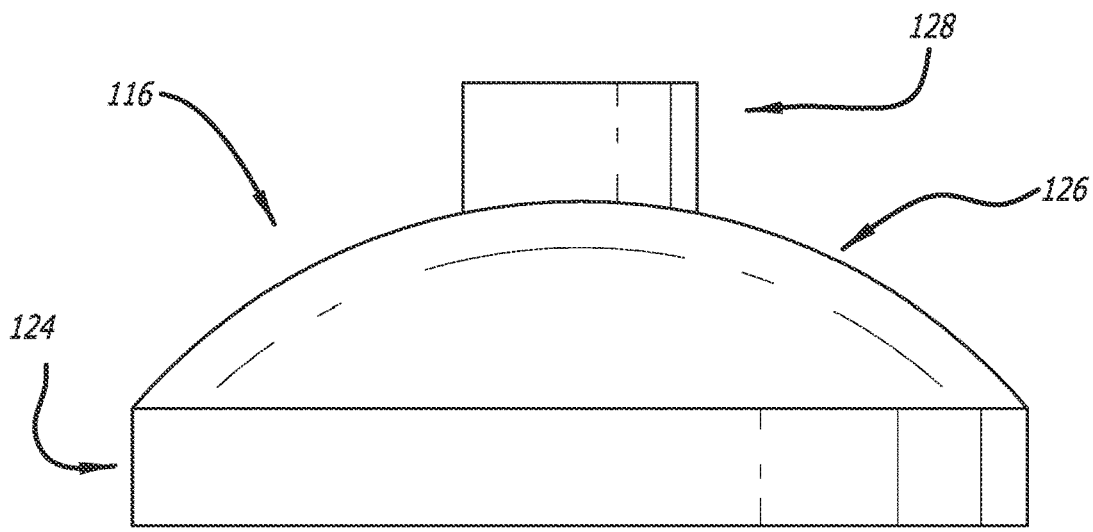
FIG. 5 is a side view of a base of an embodiment of a lighting appliance according to exemplary implementations of the present disclosure.

FIG. 5 shows a side view of base 116 of the lighting appliance 100 that may be utilized to attach the lighting appliance 100 to a surface. Base 116 may include a bottom portion 124, middle portion 126, and neck portion 128. The bottom portion 124 may be of sufficient height to give support pillars 130 (shown in FIG. 6) sufficient length to accommodate an appropriate fastening device, such as a screw or bolt, needed to attach lighting appliance 100 securely to a surface. For example, the height of bottom portion 124 may range from approximately 0.5 inches to 2 inches to allow support pillars 130 to accommodate a fastening device approximately the same length. Middle portion 126 is shown as being curved in FIG. 5, but it can have any contour necessary to extend from bottom portion 124 to neck portion 128. Neck portion 128 may have an aperture sized to accept and hold arm 118.

Figure 6:
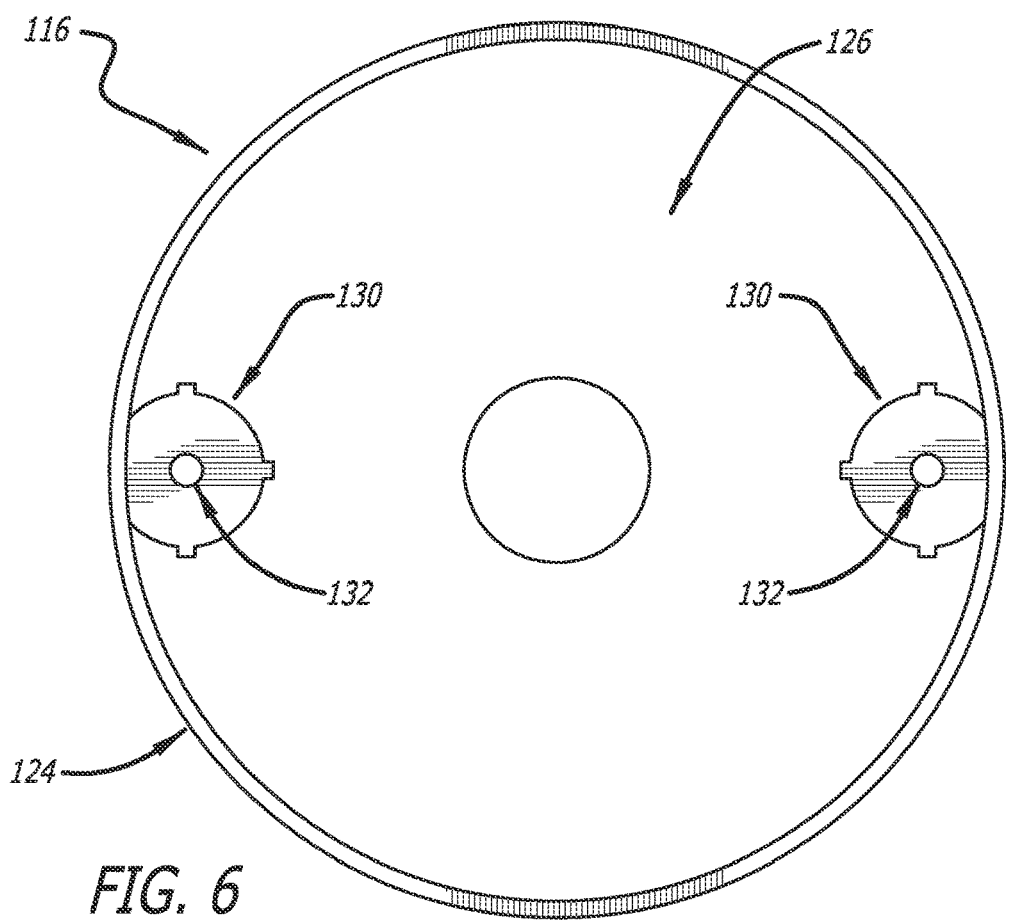
FIG. 6 is a bottom view of a base of an embodiment of a lighting appliance according to exemplary implementations of the present disclosure.

FIG. 6 shows a bottom view of base 116 with support pillars 130 attached to bottom portion 124. Support pillars 130 may also attached to the underside of middle portion 126 for added strength. Support pillars 130 may include holes 132 designed to accommodate an appropriate fastening device, such as a screw or bolt, needed to attach lighting appliance 100 securely to a surface.

Figure 7:
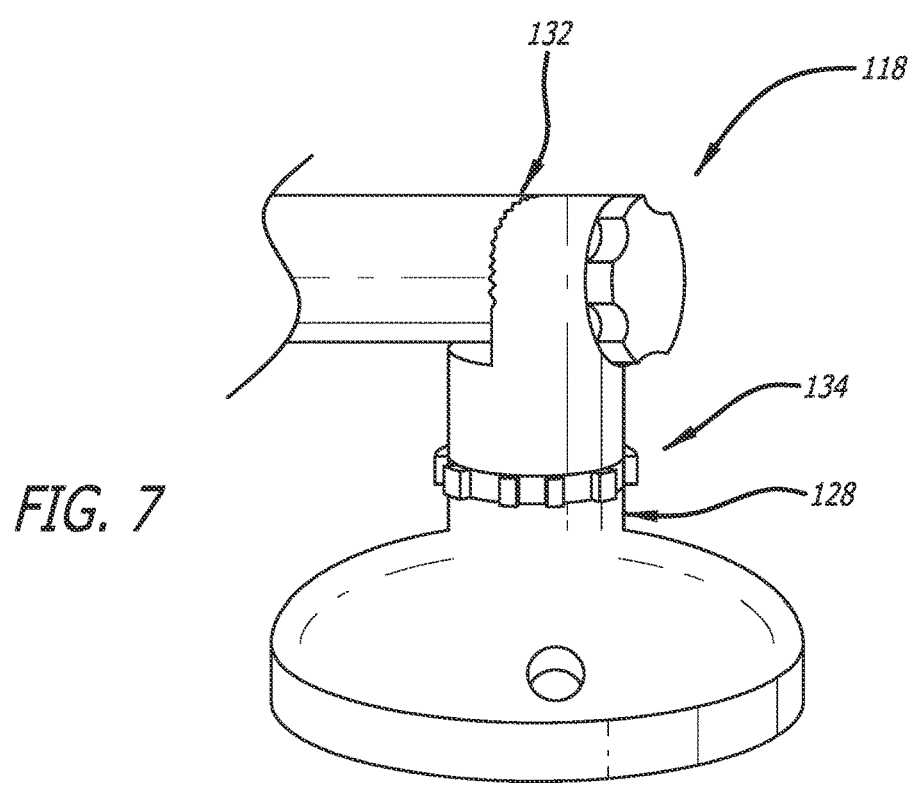

FIG. 7 shows another embodiment of arm 118. Arm 118 may include interlocking gear-like teeth 132 within some or all of the pivot points to allow the lighting element portion 122 of lighting appliance 100 to remain in a desired orientation. Arm 118 may include lock component 134 at the joint of neck portion 128 and arm 118. Lock component 134 may be used to tighten arm 118 in neck portion 128. Additionally or alternatively, lock component 134 may allow arm 118, and consequentially lighting element portion 122 of lighting appliance 100, to rotate about an axis parallel with neck portion 128 and stay in a desired fixed position.

Figure 8:
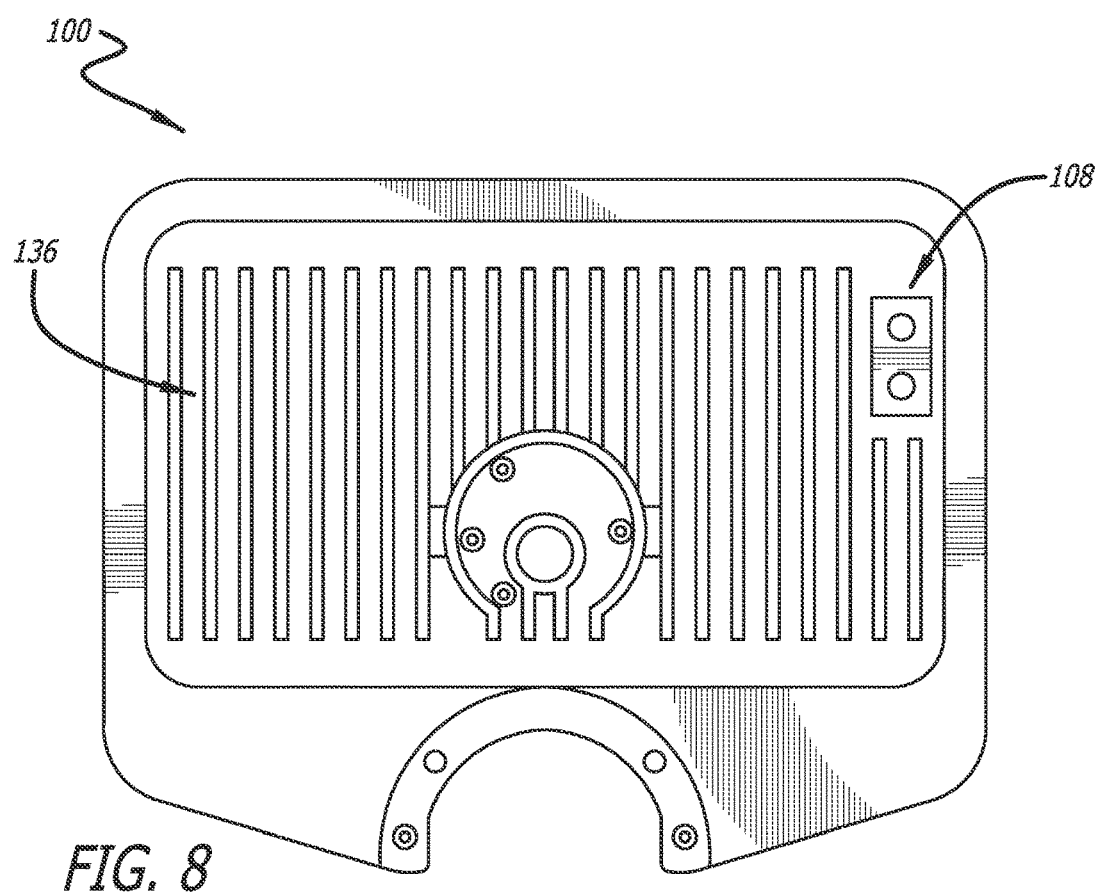
FIG. 8 is a back view of an embodiment a lighting appliance according to exemplary implementations of the present disclosure.

FIG. 8 shows a back of the lighting appliance 100. The lighting appliance 100 may include multiple ribs 136 on the back portion of housing 112 to dissipate heat. Heat dissipation is important because the PIR sensor 110 is heat sensitive. The ribs 136 may extend across a majority of the height and width of the back portion of housing 112 to improve heat dissipation. User selectable controls 108 may optionally be located on the back portion of housing 112.

FIG. 9 discloses mapping data for PIR sensor 110. FIG. 9 shows that PIR sensor 110 may have varying levels of sensitivity to detect motion depending on where the moving object is located relative to PIR sensor 110. For example, PIR sensor 110 may be able to detect motion at 17 meters if the moving object is located 90 degrees to the left of PIR sensor 110 and may be able to detect motion at 31 meters if the moving object is located 0 degrees from the middle (i.e. in the front) of PIR sensor 110. FIG. 9 shows that PIR sensor 110 has detection capability of 180 degrees-90 degrees to the left and 90 degrees to the right of PIR sensor 110.

FIG. 11 discloses exemplary lighting parameters that the lighting appliance 100 is capable of achieving at various color temperatures. For example, the lighting appliance 100 may operate in a low beam mode or a high beam mode at each color temperature. The low beam mode produces light at lower lumens than the high beam mode. The low beam mode utilizes less power than the high beam mode. FIG. 10 discloses additional exemplary power data for the lighting appliance 100.

Figure 12:
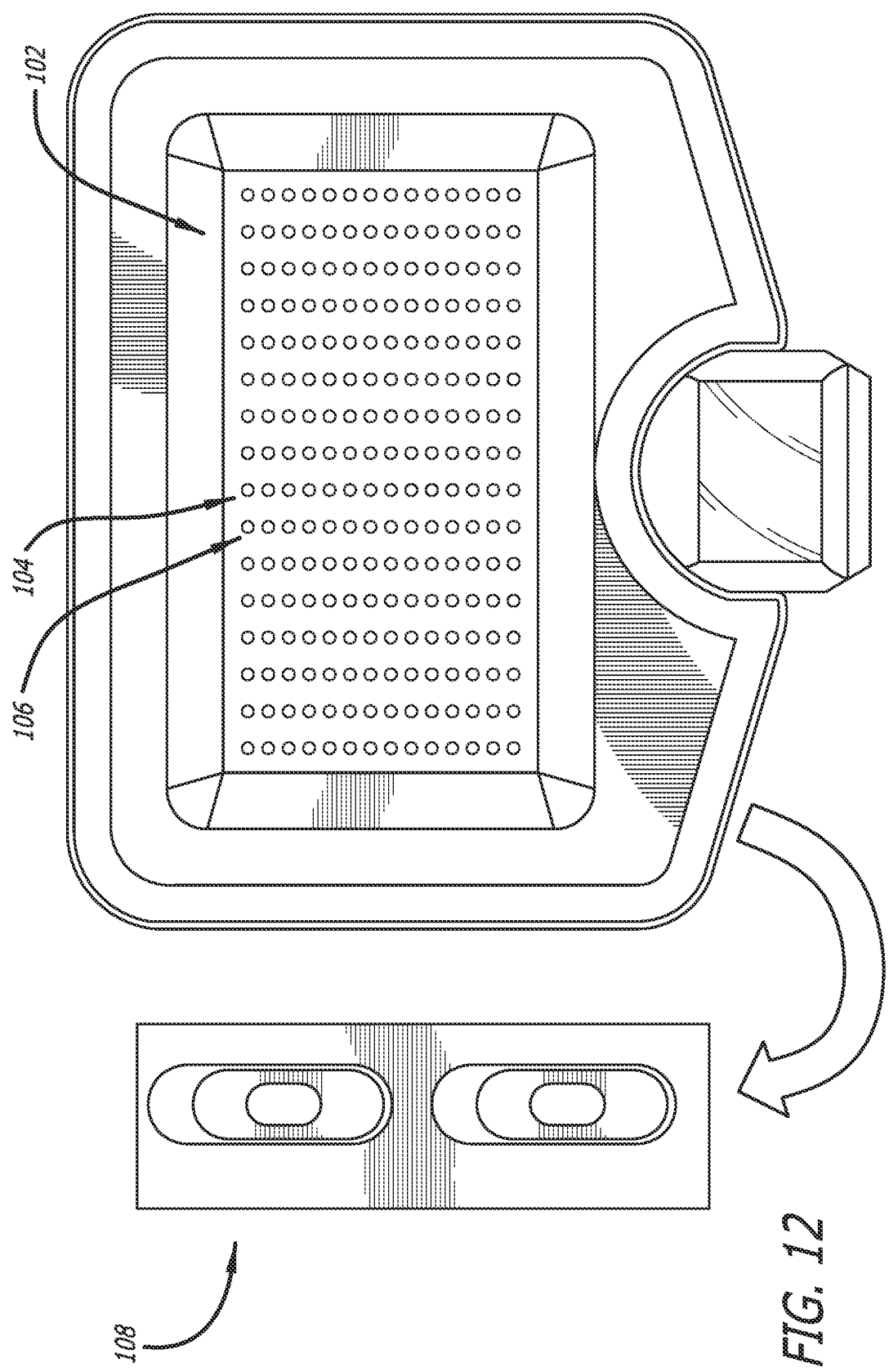
FIG. 12 is an alternative front view of an embodiment a lighting appliance according to exemplary implementations of the present disclosure.
Figure 13A:
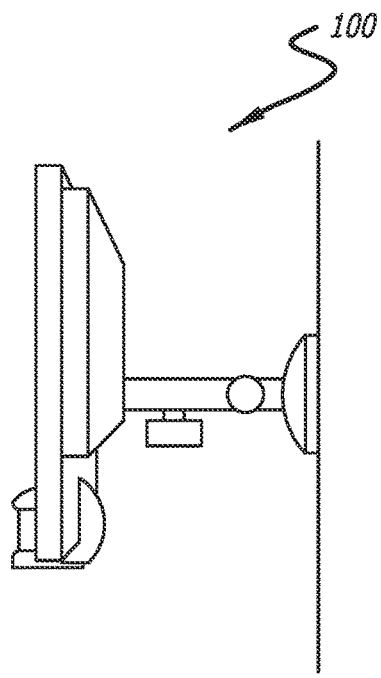
FIG. 13A is a side view of an embodiment a lighting appliance according to exemplary implementations of the present disclosure.
Figure 13B:
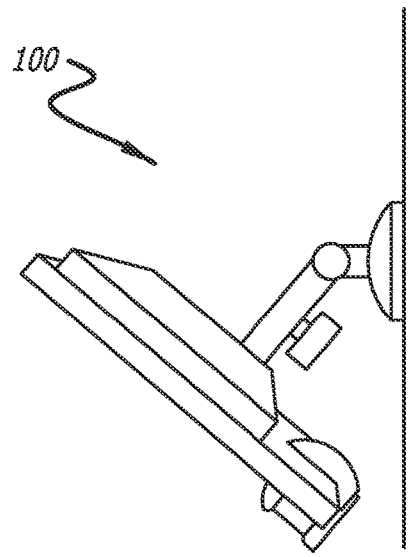
FIG. 13B is a side view of an embodiment a lighting appliance according to exemplary implementations of the present disclosure.
Figure 13C:
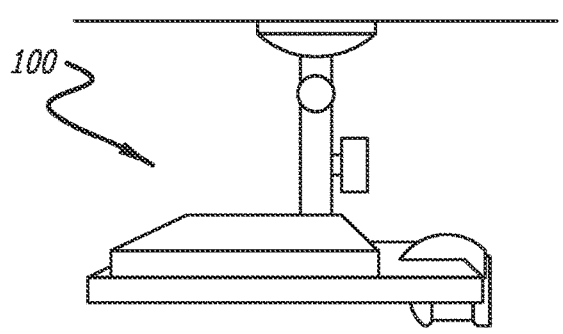
FIG. 13C is a side view of an embodiment a lighting appliance according to exemplary implementations of the present disclosure.
Figure 13D:
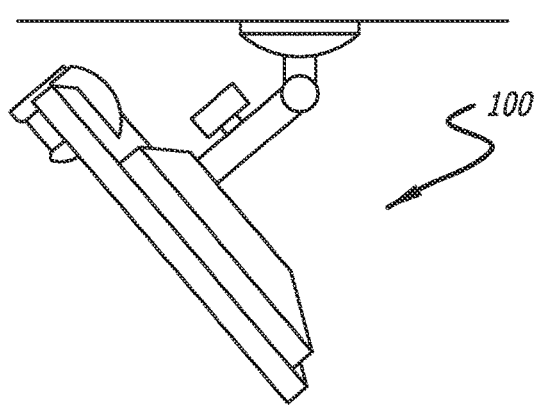
FIG. 13D is a side view of an embodiment a lighting appliance according to exemplary implementations of the present disclosure.

FIG. 12 shows a front view of lighting appliance 100 with a cover removed from lighting elements 102. Lighting appliance 100 may include multiple groups of LEDs 102, such as, for example, a first group of LEDs 104 and a second group of LEDs 106 in each lighting appliance 100, where each group of LEDs 102 emit a different color temperature of light. Lighting appliance 100 may include any number of LED 102 groups that emit different color temperatures of light. The lighting elements 102 may be recessed within housing 112, as shown in FIG. 12. FIG. 12 discloses an embodiment of user selectable controls 108 that may vary the color temperature and/or light intensity of the light emitted by lighting elements 102. User selectable controls 108 in FIG. 12 may be a slide selector. User selectable controls 108 in FIG. 12 may be located on the back of lighting appliance 100, as indicated by the curved arrow in FIG. 12.

FIG. 13 shows exemplary attachment positions and orientations for lighting appliance 100. FIG. 13A show that lighting appliance 100 may be attached to a vertical surface, such as a wall, with arm 118 extended straight. The light emitted by lighting appliance 100 in FIG. 13A will be directed forward relative to lighting appliance 100. FIG. 13B show that lighting appliance 100 may be attached to a vertical surface, such as a wall, with arm 118 angled downward. The light emitted by lighting appliance 100 in FIG. 13B will be directed downward and forward relative to lighting appliance 100. FIG. 13C show that lighting appliance 100 may be attached to the underside of a horizontal surface, such as an eave, with arm 118 extended straight. The light emitted by lighting appliance 100 in FIG. 13C will be directed downward relative to lighting appliance 100. The sensing area of motion sensor 110 will vary depending on the orientation of lighting appliance 100 shown in FIG. 13. For example, the sensing area of motion sensor 110 will predominately be downward in the orientation of lighting appliance 100 shown in FIG. 13C.

Figure 14:
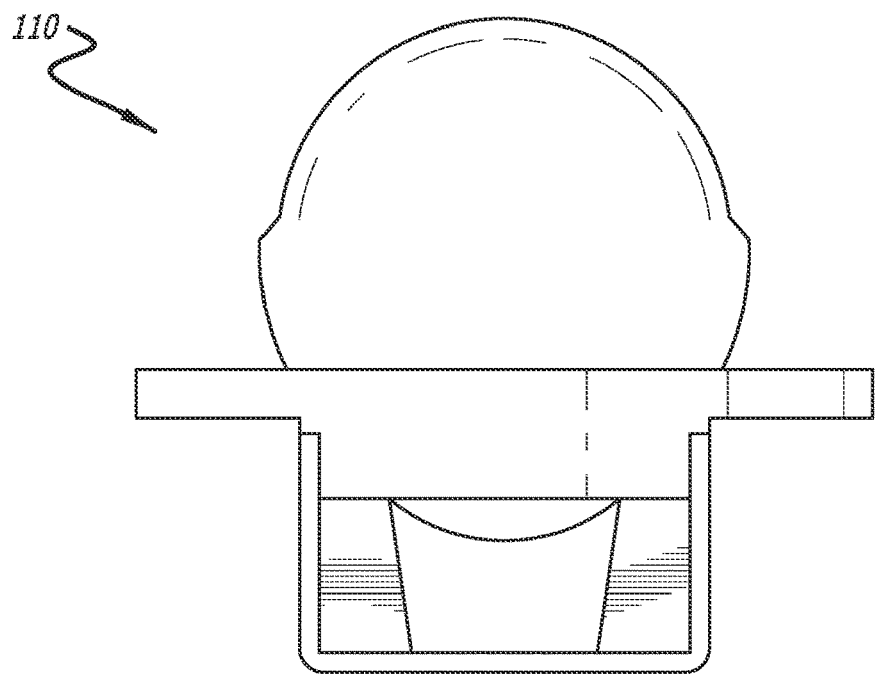
FIG. 14 is a view of a passive infrared sensor housing of a lighting appliance according to exemplary implementations of the present disclosure.
Figure 15:
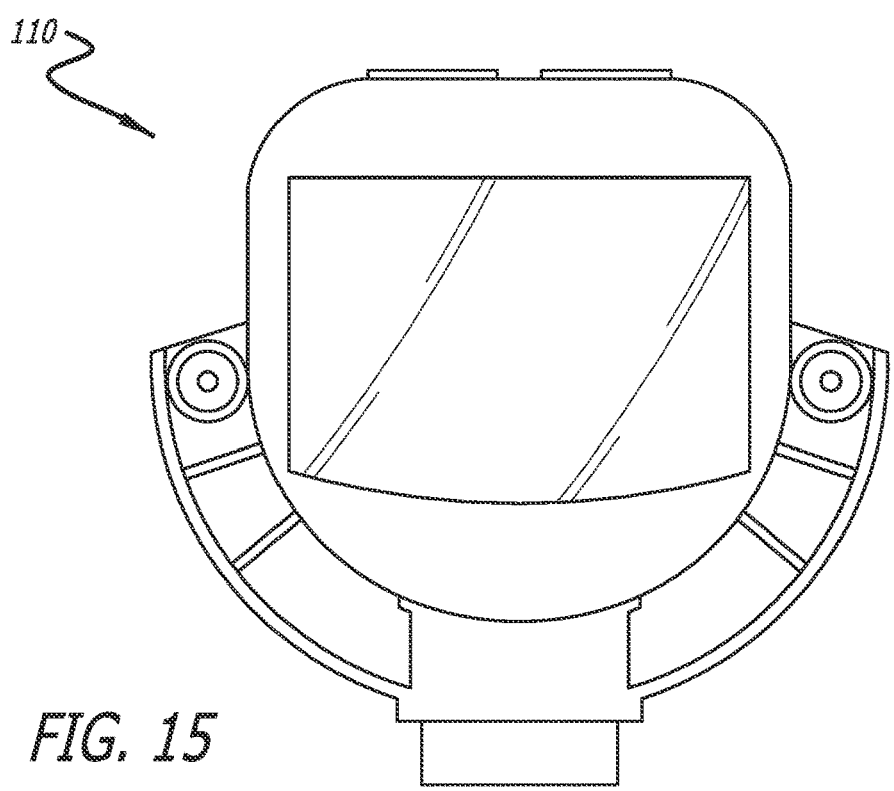
FIG. 15 is a view of a passive infrared sensor of a lighting appliance according to exemplary implementations of the present disclosure.

FIG. 14 and FIG. 15 show the PIR sensor 110 housing in lighting appliance 100. The PIR sensor 110 and moveable mounting portions of the lighting appliance 100 will have improved rotation and movability because the components will be finished with injection texture and color, instead of surface painting.

A Printed Circuit Board or PCB may be disposed within the housing 112 of the lighting appliance 100 to comprise a lighting control unit for intelligently charging, controlling the sensor, or performing other functions. The PCB electrically connects the power and each of the lighting elements 102 to provide electrical power for the operation of each of the multiple lighting element 102, and individual groups of lighting elements 102. An individual group of lighting elements 102 may be operated separately or together with other groups of lighting elements 102. Further, one or more electrical leads may electrically connect one or more of the lighting elements 102, power, PCB and/or any of the above-described motion sensors 110 and user controls to facilitate lighting appliance operations. The PCB can also supply electrical power to the lighting elements 102 directly from the external power source.

The lighting appliance housing 112 can be made in a variety of shapes including square, rectangular, elongated rectangular, and circular. The lighting appliance 100 can also be made in a variety of sizes to fit into small spaces, mounted onto narrow surfaces, or to accommodate additional lighting elements. Further, the lighting appliance 100 may utilize plastic with glass fiber added for improved strength. The lighting appliance housing 112 may be designed to have an IP65 rating or better, indicating that it is dust proof and water resistant.

The lighting appliance 100 meets the UL loading test on the arm 118 and bracket 114. According to the UL standard, the total mass of the lighting appliance 100 was measured, and then the standard weight for loading equal to 4 times the total weight was prepared. The lighting appliance 100 was then hung with the load on the arm 118 and bracket 114 for one hour at two mounting conditions—eave mount and wall mount. For example, the weight of the lighting appliance 100 may be 1.37 kg, so 4 times the load is 5.48 kg. The weight of the load used during testing is 6 kg, which is more than 4 times it weight for loading test. Both loading tests on eave mount and wall mount passed the UL loading test. The lighting appliance 100 also met the UL strain relief standard by the cord withstanding a 156 N load for one minute.

While the foregoing has described what are considered to be exemplary embodiments, it is understood that various modifications may be made therein and that the subject matter disclosed herein may be implemented in various forms and examples, and that the teachings may be applied in numerous applications, only some of which have been described herein. Other implementations are also contemplated.

The invention claimed is:

1. A lighting appliance, comprising:
a housing;
a lighting element disposed in the housing, wherein lighting element is capable of displaying multiple color temperatures;
a control unit disposed in the housing;
an electrical communication system in communication with the lighting element and the control unit; and
a sensor disposed on a portion of the housing, the sensor being in communication with the lighting element and the control unit via the electrical communication system, wherein when a motion signal is detected by the sensor, the control unit is configured to instruct the lighting element to illuminate in a predetermined light mode for a predetermined time;
wherein the intensity of the light emitted by the lighting element is adjustable for each of the multiple color temperatures.

2. The lighting appliance of claim 1, wherein the predetermined light mode comprises energizing, dimming, or flashing of the lighting elements.

3. The lighting appliance of claim 1, wherein the predetermined time is ten minutes.

4. The lighting appliance of claim 1, wherein the sensor is a motion sensor.

5. The lighting appliance of claim 4, wherein the motion sensor is configured to detect a motion signal in at least two different detection modes.

6. The lighting appliance of claim 5, wherein the motion sensor is configured to detect a motion signal in a surface detection mode that detects movement below the lighting appliance.

7. The lighting appliance of claim 5, wherein the motion sensor is configured to detect a motion signal in a walk-by detection mode that detects movement in front of the lighting appliance.

8. The lighting appliance of claim 1, wherein the lighting element comprises a first group of LEDs and a second group of LEDs, wherein the first group of LEDs emits a different color temperature of light than the second group of LEDs.

9. The lighting appliance of claim 8, wherein the color temperature of light emitted is varied by selectively activating the first group of LEDs or the second group of LED.

10. The lighting appliance of claim 1, wherein the color temperatures displayed by the lighting element range from 3000K to 5000K.

11. The lighting appliance of claim 1, wherein the housing includes a back portion opposite the lighting element, the lighting appliance further comprising a plurality of elongated ribs protruding from the back portion of the housing.

12. The lighting appliance of claim 1, wherein the intensity of light emitted includes a lower intensity of light and a high intensity of light.

13. The lighting appliance of claim 1, further comprising a user selectable control to adjust the color temperature of light emitted by the lighting element.

14. The lighting appliance of claim 1, wherein the lighting element is operated in a manual mode independent of the sensor.

15. The lighting appliance of claim 1, wherein the lighting appliance is configured to fixable to the underside of a horizontal surface.

16. The lighting appliance of claim 1, further comprising an arm connected to the housing, wherein the arm includes a plurality of pivot points.

17. The lighting appliance of claim 16, wherein at least one of the plurality of pivot points include interlocking teeth to fix the pivot point in an orientation.

18. The lighting appliance of claim 16, further comprising a base that is in mechanical communication with the arm, wherein the base includes a top surface and an undersurface opposite the top surface.

19. A lighting appliance, comprising:
a housing;
a lighting element disposed in the housing, wherein lighting element is capable of displaying multiple color temperatures;
a control unit disposed in the housing;
an electrical communication system in communication with the lighting element and the control unit;
a sensor disposed on a portion of the housing, the sensor being in communication with the lighting element and the control unit via the electrical communication system, wherein when a motion signal is detected by the sensor, the control unit is configured to instruct the lighting element to illuminate in a predetermined light mode for a predetermined time;
an arm connected to the housing, wherein the arm includes a plurality of pivot points;
a base that is in mechanical communication with the arm, wherein the base includes a top surface and an undersurface opposite the top surface; and
a plurality of support pillars fixed to the undersurface of the base, wherein each of the plurality of support pillars include an opening to accept a fastening device to attach the lighting appliance to a fixed surface.

\* \* \* \* \*